(12) United States Patent
Hong

(10) Patent No.: US 8,007,109 B2
(45) Date of Patent: Aug. 30, 2011

(54) THREE-DIMENSIONAL DISPLAY DEVICE AND DISPLAYING METHOD USING THE SAME

(75) Inventor: Hyung-Ki Hong, Seoul (KR)

(73) Assignee: LG Display Co. Ltd., Seoul (KR)

( * ) Notice: Subject to any disclaimer, the term of this patent is extended or adjusted under 35 U.S.C. 154(b) by 784 days.

(21) Appl. No.: 11/965,264

(22) Filed: Dec. 27, 2007

(65) Prior Publication Data

US 2009/0009862 A1    Jan. 8, 2009

(30) Foreign Application Priority Data

Jul. 6, 2007  (KR) .................. 10-2007-0068114

(51) Int. Cl.
*G02B 27/24*    (2006.01)
(52) U.S. Cl. .................. 353/7; 353/37; 353/30; 353/98; 353/10; 353/78
(58) Field of Classification Search .............. 353/7, 37, 353/30, 98, 10, 78; 359/725, 479, 630, 631, 359/633, 478, 629
See application file for complete search history.

(56) References Cited

U.S. PATENT DOCUMENTS

2008/0144175 A1 *  6/2008  Simonsen .................. 359/479

OTHER PUBLICATIONS

"Pepper's Ghost." Wikipedia. Dec. 27, 2007 <http://en.wikipedia.org/wiki/Pepper's-_ghost>.
Otsuka, Reiko et al. "Transpost: All Around Display System," VRST 04, Nov. 10-12, 2004, 187-194, Hong Kong.

* cited by examiner

*Primary Examiner* — Tony Ko
(74) *Attorney, Agent, or Firm* — Brinks Hofer Gilson & Lione

(57) ABSTRACT

A three-dimensional display device includes a display panel displaying first to $n^{th}$ partial images along a circumference; and an n-gonal pyramid mirror including first to $n^{th}$ mirrors at n side surfaces, respectively, of the n-gonal pyramid mirror, wherein the first to $n^{th}$ mirrors reflect the first to $n^{th}$ partial images, respectively, and wherein each of the first to $n^{th}$ mirrors substantially makes a 45 degree angle with the display panel.

9 Claims, 15 Drawing Sheets

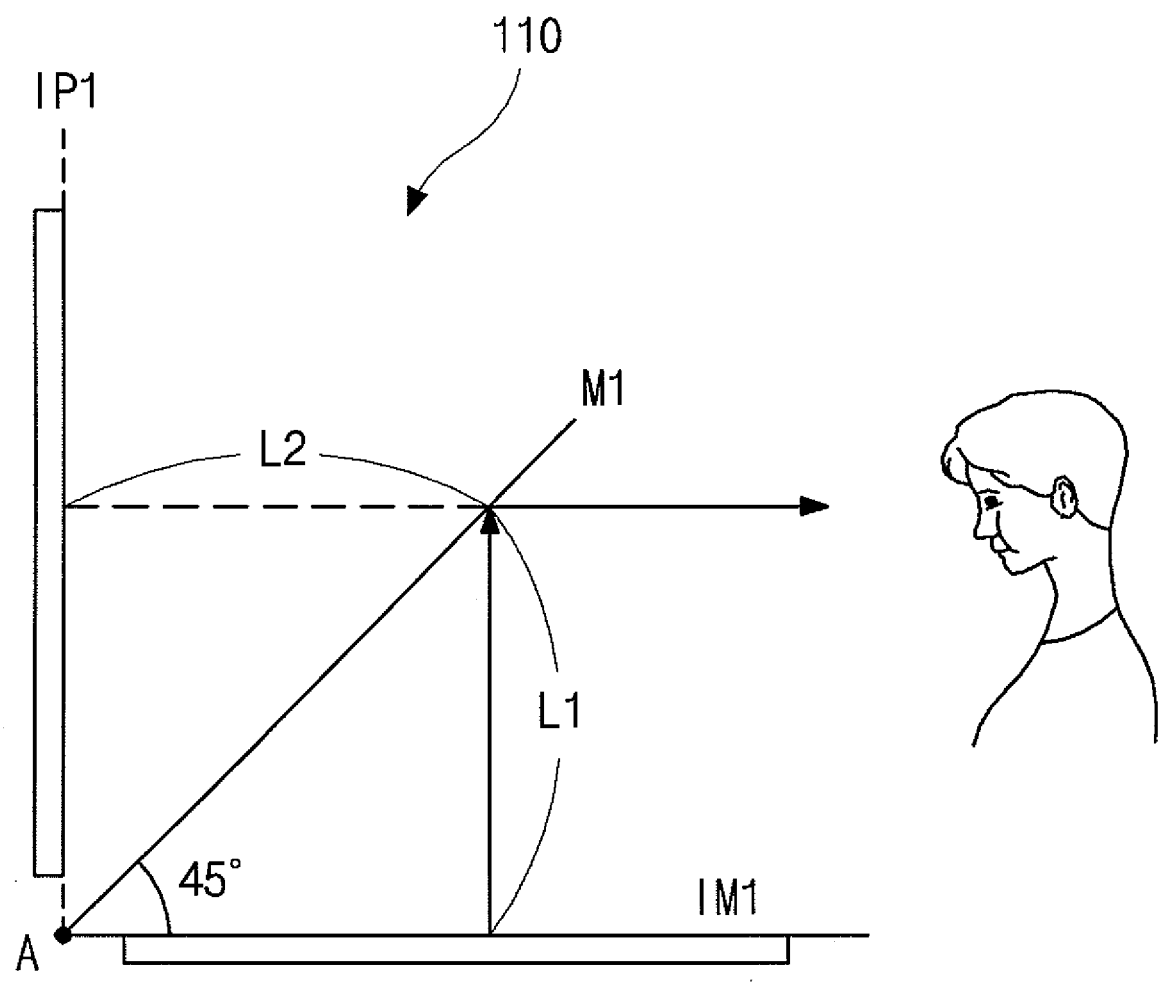

n=4 n=5

THREE-DIMENSIONAL DISPLAY DEVICE AND DISPLAYING METHOD USING THE SAME

CLAIM FOR PRIORITY

This application claims the benefit of Korean Patent Application No. 10-2007-0068114, filed in Korea on Jul. 6, 2007, which is hereby incorporated by reference in its entirety.

BACKGROUND OF THE INVENTION

1. Field of the Invention

The invention relates to a three-dimensional display device and a displaying method using the same.

2. Discussion of the Related Art

A two-dimensional display device is generally used. Recently, because of wideband communication networks, a three-dimensional display device has been researched and developed.

There are various types of three-dimensional image displays, for example, a holographic image type, a stereographic type, a volumetric type and the like.

The holographic type is used for a holographic image using a laser or a white ray.

The stereographic type display device displays a three-dimensional image using binocular parallax. The stereographic type display device includes a display device that uses specific glasses and a display device without glasses. The stereoscopic display devices without glasses are divided into a parallax barrier type, a lenticular type, and the like.

The volumetric type is used for three-dimensional computer graphics or an I-MAX movie. Of volumetric types, a floating image display device is suggested. The floating image display device displays a floating image using a rotating screen. Different images in various directions are projected on the rotating screen, and viewers perceive the different images.

FIG. 1A is a conceptional view illustrating a floating image display device according to the related art, and FIG. 1B is a perspective view illustrating a floating image display device according to the related art.

Referring to FIG. 1A, in the floating image display device 10, a screen 12 rotates in a cylindrical case. While the screen rotates 12, first to fourth partial images IM1 to IM4 in different four directions are projected on the screen 12, and viewers in the four directions view the respective four images IM1 to IM4.

In other words, when the viewer turns around and looks at the screen 12, the viewer perceives as if the viewer really were viewing a three-dimensional object in various directions.

In detail, referring to FIG. 1B, the floating image display device 10 includes the rotating screen 12, a projector 14, a motor 16, a first mirror M1, and a plurality of second mirrors M2.

The screen 12 can rotate 360 degrees, the projector 14 projects a plurality of partial images IM1 to IMn on the first mirror M1, and the first mirror M1 reflects the plurality of partial images IM1 to IMn toward the plurality of second mirrors M2. The plurality of second mirrors M2 reflect the plurality of partial images IM1 to IMn, respectively, toward the screen 12. When the screen 12 rotates and faces one of the plurality of the second mirrors M2, the viewer in a direction of the one of the plurality of second mirrors M2 views the partial image corresponding to the one of the plurality of second mirrors M2.

Accordingly, the viewer turns 360 degrees and perceives different partial images. When the plurality of partial images IM1 to IMn are made as different images for a three-dimensional object viewed in various directions, the viewer perceives as if the three-dimensional object existed.

However, because the related art floating image display device needs the motor 16 to rotate the screen 12, power consumption is much, and volume and weight of the display device increase. Further, because the second mirrors M2 and the screen 12 are located in different structural components of the display device, accuracy of reflecting angle decreases and quality of the image viewed by the viewer decreases. This problems increase with vibration due to rotation of the motor 12.

SUMMARY

A three-dimensional display device includes a display panel displaying first to $n^{th}$ partial images along a circumference; and an n-gonal pyramid mirror including first to $n^{th}$ mirrors at n side surfaces, respectively, of the n-gonal pyramid mirror, wherein the first to $n^{th}$ mirrors reflect the first to $n^{th}$ partial images, respectively, and wherein each of the first to $n^{th}$ mirrors substantially makes a 45 degree angle with the display panel.

In another aspect, a three-dimensional display device includes a display panel displaying first to $m^{th}$ partial images along a circle arc; and a partial n-gonal pyramid mirror including first to $m^{th}$ mirrors at m side surfaces, respectively, out of n side surfaces of an n-gonal pyramid, wherein the first to $m^{th}$ mirrors reflect the first to $m^{th}$ partial images, respectively, and wherein each of the first to $m^{th}$ mirrors substantially makes a 45 degree angle with the display panel.

In another aspect, a method of displaying a three-dimensional image includes dividing an image to set first to $n^{th}$ partial images; displaying the set first to $n^{th}$ partial images along a circumference in a display panel; and reflecting the displayed first to $n^{th}$ partial images on first to $n^{th}$ mirrors, respectively, of an n-gonal pyramid mirror, wherein each of the first to $n^{th}$ mirrors substantially makes a 45 degree angle with the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 4 is a cross-sectional view illustrating operation of displaying a partial image in a three-dimensional display device according to the first embodiment;

DETAILED DESCRIPTION OF THE EMBODIMENTS

Reference will now be made in detail to the illustrated embodiments of the present invention, which are illustrated in the accompanying drawings.

Figure 1A:
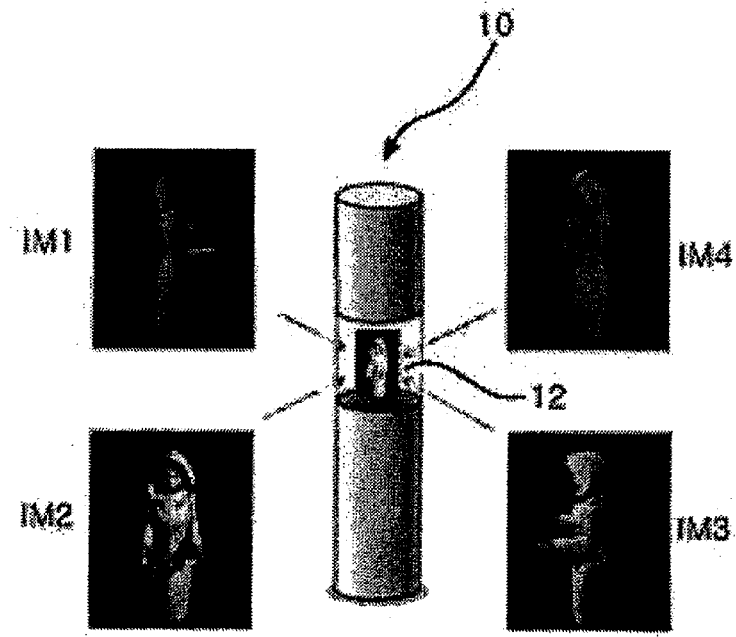
FIG. 1A is a conceptional view illustrating a floating image display device according to the related art.
Figure 1B:
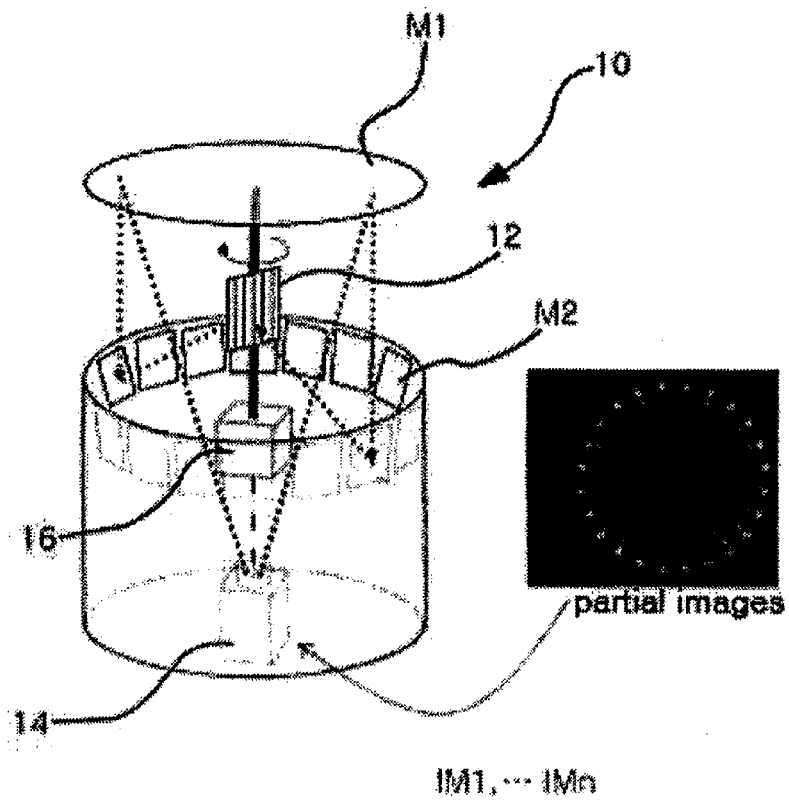
FIG. 1B is a perspective view illustrating a floating image display device according to the related art.
Figure 2:
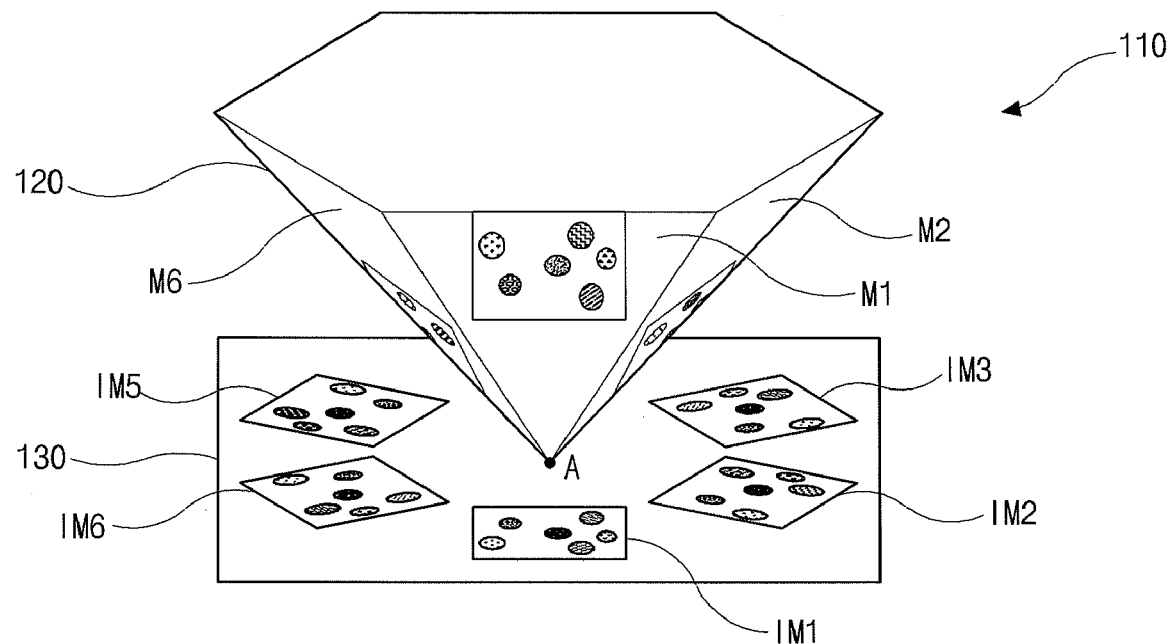
FIG. 2 is a perspective view illustrating a three-dimensional display device according to a first embodiment.

FIG. 2 is a perspective view illustrating a three-dimensional display device according to a first embodiment.

Referring to FIG. 2, the three-dimensional display device 110 of the first embodiment may be a floating image display device. The three-dimensional display device 110 includes polygonal pyramid mirror, for example, a hexagonal pyramid mirror 120, and a display panel 130.

The hexagonal pyramid mirror 120 may be located on a middle portion of the display panel 130 such that an apex A of the mirror 120 faces the display panel 130. The hexagonal pyramid mirror 120 may include first to sixth triangular mirrors M1 to M6 at sides of the mirror 120. The first to sixth triangular mirrors M1 to M6 may have reflectance more than 0% and equal to or less than 100%.

The display panel 120 may display a plurality of partial images, for example, first to sixth partial images IM1 to IM6 corresponding to the first to sixth mirrors M1 to M6, respectively. To do this, the display panel 120 may have first to sixth display regions to display the first to sixth partial images IM1 to IM6, respectively. Alternatively, a plurality of display panels, for example, first to sixth display panels corresponding to the first to sixth mirrors M1 to M6 may be used to display the first to sixth partial images IM1 to IM6, respectively, and the first to sixth display panels may be located on respective supporting means.

The first to sixth mirrors M1 to M6 reflect the first to sixth partial images IM1 to IM6, respectively, toward viewers.

The viewer turns a 360 degree angle around the hexagonal pyramid mirror 120 and views different partial images. The viewer views the first to sixth partial images IM1 to IM6 when the viewer is in front of the first to sixth mirrors M1 to M6. Further, the viewer views new images combining two partial images when the viewer is in front of a boundary between adjacent two mirrors. Accordingly, the three-dimensional display device 110 can display stable and natural floating images.

Figure 3A:
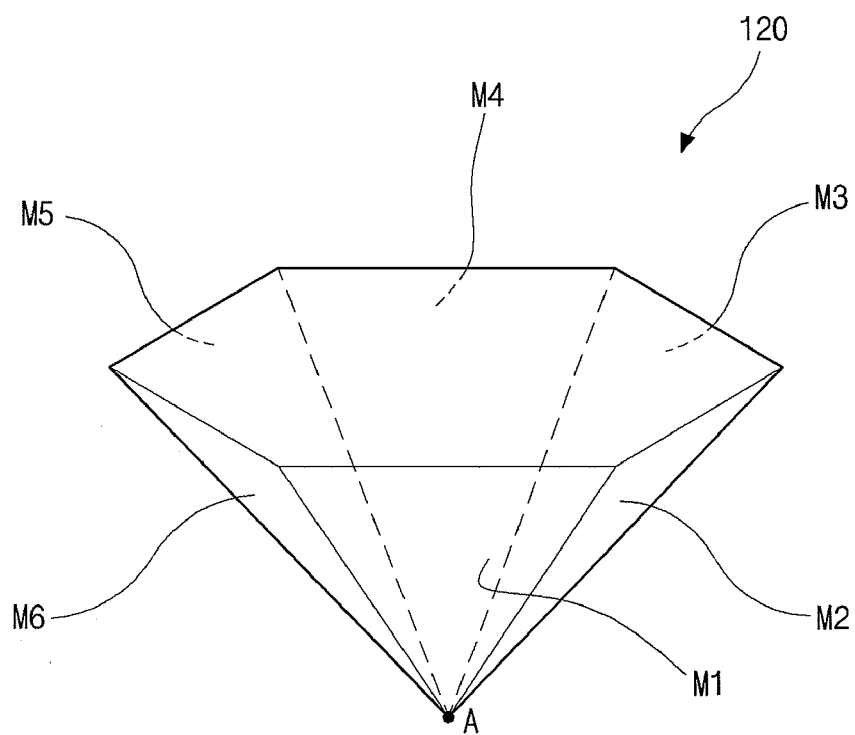
FIG. 3A is a perspective view illustrating a hexagonal pyramid mirror of a three-dimensional display device according to the first embodiment.
Figure 3B:
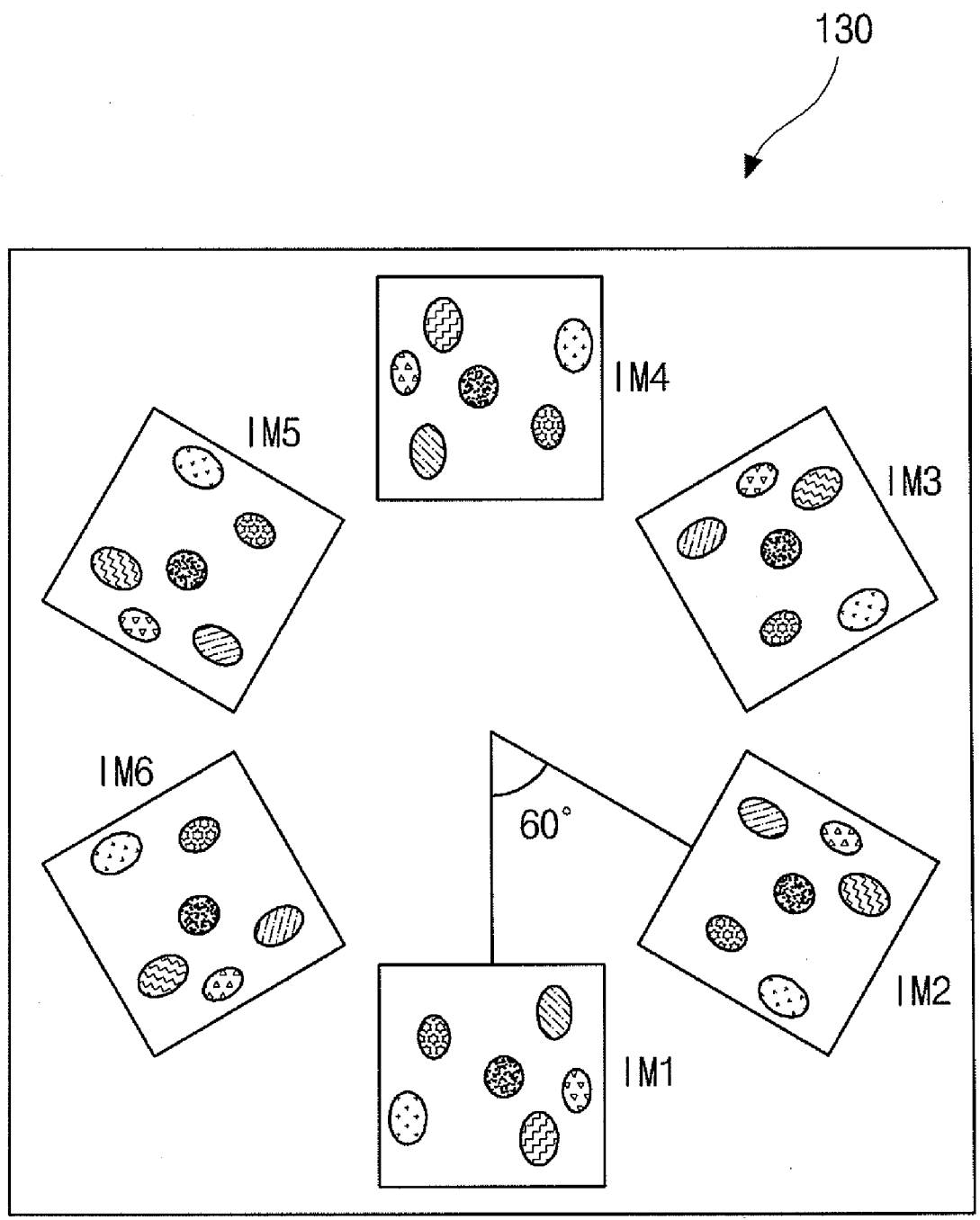
FIG. 3B is a plan view illustrating a display panel of a three-dimensional display device according to the first embodiment.

FIG. 3A is a perspective view illustrating a hexagonal pyramid mirror of a three-dimensional display device according to the first embodiment, and FIG. 3B is a plan view illustrating a display panel of a three-dimensional display device according to the first embodiment.

Referring to FIG. 3A, the hexagonal pyramid mirror 120 includes first to sixth mirrors M1 to M6 sharing an apex A, and a surface of the mirror 120 opposite to the apex A has a hexagonal shape.

The hexagonal pyramid mirror 120 may have a symmetrical structure, and to do this, the first to sixth mirrors M1 to M6 may be all identical and have an isosceles triangular shape. The surface of the mirror 120 opposite to the apex may have a regular hexagonal shape.

Referring to FIG. 3B, the display panel 130 may make first to sixth partial images IM1 to IM6 corresponding to the first to sixth mirrors M1 to M6, respectively. When the first to sixth mirrors M1 to M6 are symmetrical, the first to sixth partial images M1 to M6 may be arranged along a circumference such that adjacent two partial images makes a 60 degree angle with each other.

FIG. 4 is a cross-sectional view illustrating operation of displaying a partial image in a three-dimensional display device according to the first embodiment.

Referring to FIG. 4, a first mirror M1 of the hexagonal pyramid mirror (120 of FIG. 2) corresponds to a first partial image IM1 of the display panel (120 of FIG. 2) with the first mirror M1 making a 45 degree angle with the display panel.

The first partial image IM1 reflects on the first mirror M1 and transmitted to a viewer. The viewer perceives as if the first partial image IM1 were displayed at a first image plane IP1 of a virtual plane behind the first mirror M1.

When the display panel is in a horizontal plane and an apex A contacts the display panel and the first mirror M1 makes a 45 degree angle with the display panel, the first partial image IM1 reflects on the first mirror M1 and is horizontally transmitted to the viewer.

Accordingly, the first image plane IP1 is located behind the first mirror M1 such that a distance L1 between the first mirror M1 and one pixel of the first partial image IM1 is identical to a distance L2 between the first mirror M1 and one pixel of the first plane IP1 corresponding to the one pixel of the first partial image IM1.

The operation of displaying the first partial image as described above may identically apply to other mirrors (M2 to M6 of FIG. 3A), and the viewer turns around and perceives as if the first to sixth partial images IM1 to IM6 existed at corresponding virtual planes. Accordingly, the viewer can views a floating image as if a real object were floated in space.

Figure 5A:
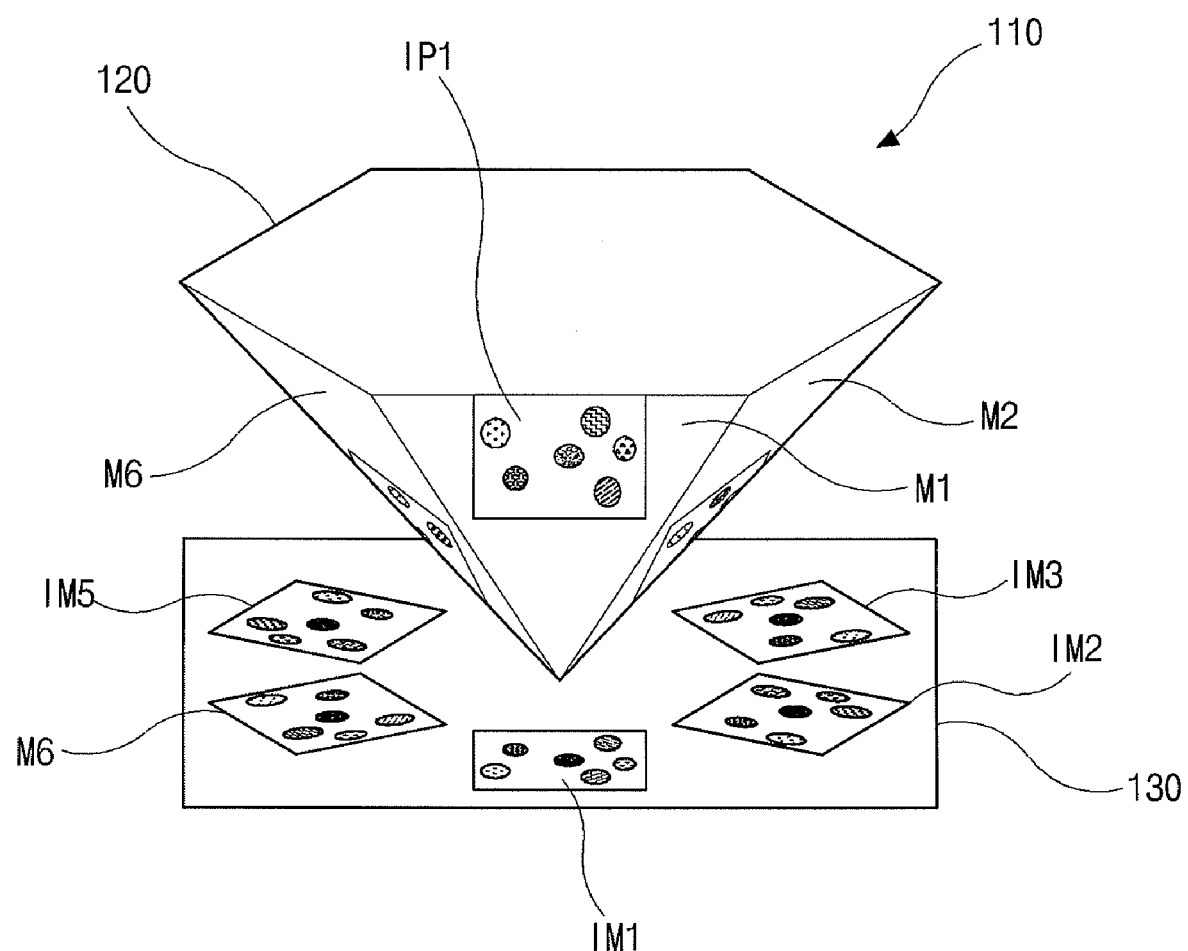
FIG. 5A is a perspective view illustrating a three-dimensional display device, when a viewer views the three-dimensional display device in front of a first mirror, according to the first embodiment.
Figure 5B:
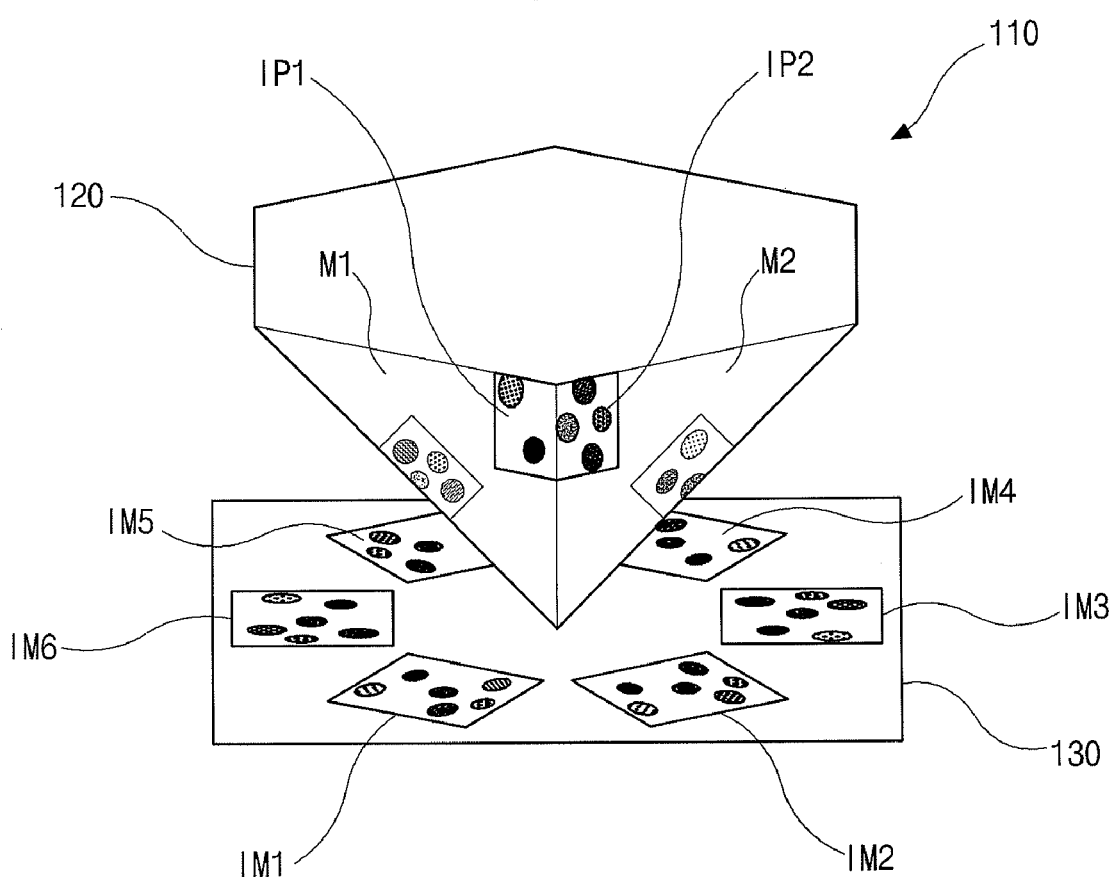
FIG. 5B is a view illustrating a three-dimensional display device, when the viewer views the three-dimensional display device in front of a boundary between first and second mirrors, according to the first embodiment.

FIG. 5A is a perspective view illustrating a three-dimensional display device, when a viewer views the three-dimensional display device in front of a first mirror, according to the first embodiment, and FIG. 5B is a view illustrating a three-dimensional display device, when the viewer views the three-dimensional display device in front of a boundary between first and second mirrors, according to the first embodiment.

Referring to FIG. 5A, when a viewer views the three-dimensional display device 110 in front of the first mirror M1, the viewer views a first partial image IM1 at the first image plane IP1. A second partial image IM2 may reflect on the first or second mirror M1 or M2 and be transmitted to the viewer, and a sixth partial image IM6 may reflect on the first or sixth mirror M1 or M6 and be transmitted to the viewer. Because the second or sixth partial image IM2 or IM6 is incident on or reflects on the first mirror M1 with large incident or reflecting angle, large amount of image information which can prevent the viewer from normally viewing the first partial image IM1 is not transmitted to the viewer.

Referring to FIG. 5B, when the viewer views the three-dimensional display device 110 in front of a boundary of the first and second mirrors M1 and M2, the viewer combines a part of a first partial image IM1 at a first image plane IP1 and a part of a second partial image IM2 at a second image plane IP2 and perceives the combined parts as one of images which are continuous between the first partial image IM1 and the second partial image IM2.

If a third partial image IM3 reflects on the second mirror M2 or a sixth partial image IM6 reflects on the first mirror M1 is transmitted to the viewer in the direction of the boundary between the first and second mirrors M1 and M2, this may cause problems. In other words, because the viewer is located in the direction of the boundary, even though the third partial image IM3 incident on or reflecting on the second mirror M2 has large incident or reflecting angle or the sixth partial image IM6 incident on or reflecting on the first mirror M1 has large incident or reflecting angle, the third partial image IM3 or the sixth partial image IM6 has high possibility to be transmitted to the viewer. To prevent this, it is desired that the display panel 130 has a high condensing property. For example, the display panel 130 may display the first to sixth partial images IM1 to IM6 such that the first to sixth partial images IM1 to IM6 are emitted from the display panel 130 within a 10 degree angle with respect to a line perpendicular to a plane of the display panel 130. This decreases possibility that each of the first to sixth partial images IM1 to IM6 is incident on the mirror adjacent to the corresponding mirror.

Further, in order that the display panel 130 has the high condensing property, the display panel 130 may have a high condensing backlight unit which can emit light substantially to travel straightly. Alternatively, the display panel 130 may be a projector having a high condensing property.

As described in the first embodiment, while the viewer turns around the three-dimensional display device, the viewer can views the partial images and further combine parts of the partial images and view the combined parts. Accordingly, stable and natural continuous floating images can be displayed.

In the first embodiment, the apex nearly contacts the display panel in the first embodiment. Alternatively, the apex may be located below the display panel as in a following second embodiment.

Figure 6A:
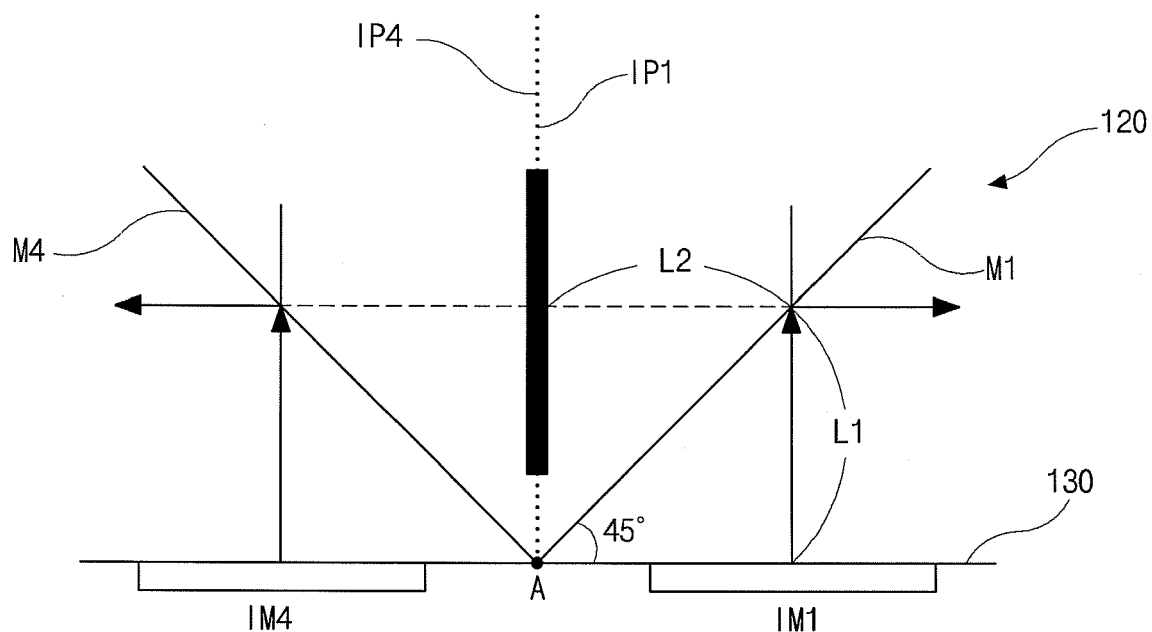
FIGS. 6A and 6B are cross-sectional and plan views, respectively, illustrating the three-dimensional display device according to the first embodiment.
Figure 6B:
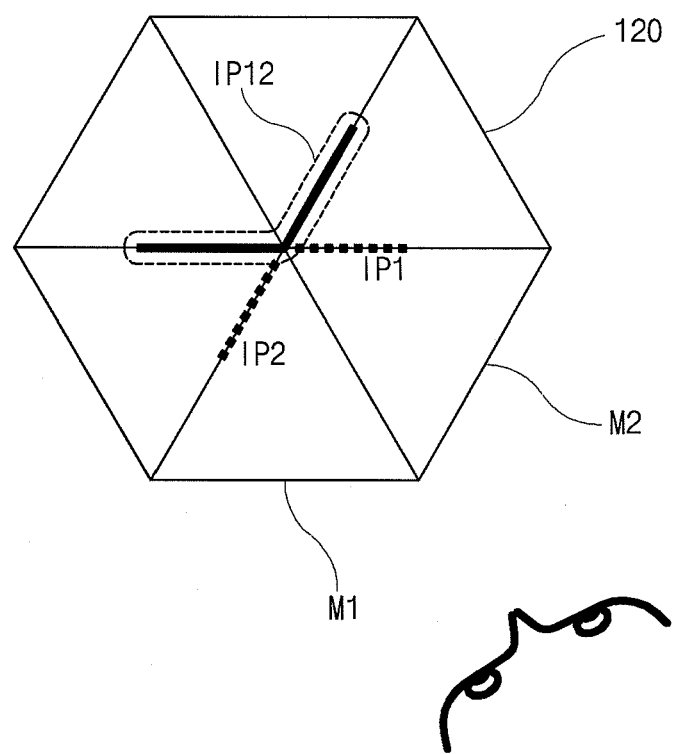
Figures 7A, 7B:
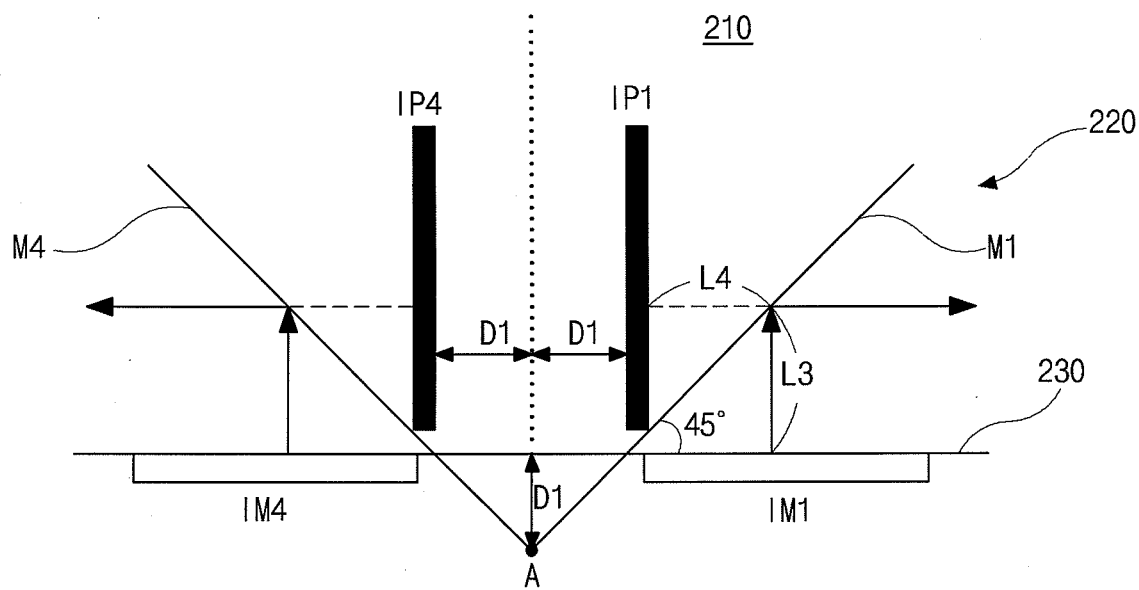
FIGS. 7A and 7B are cross-sectional and plan views, respectively, illustrating a three-dimensional display device according to a second embodiment.

FIGS. 6A and 6B are cross-sectional and plan views, respectively, illustrating the three-dimensional display device according to the first embodiment, and FIGS. 7A and 7B are cross-sectional and plan views, respectively, illustrating a three-dimensional display device according to a second embodiment.

Referring to FIG. 6A, in the three-dimensional display device 110 of the first embodiment, the apex A of the hexagonal pyramid mirror 120 substantially contacts the display panel 130. In other words, a distance between the apex A and the display panel 130 is substantially 0.

The first image plane IP1 is located such that a distance L1 between the first mirror M1 and one pixel of the first partial image IM1 is identical to a distance L2 between the first mirror M1 and one pixel of the first plane IP1 corresponding to the one pixel of the first partial image IM1. Accordingly, when the first mirror M1 makes a 45 degree angle with the display panel 130, the first image plane IP1 symmetrical with the first partial image IM1 of the display panel 130 with respect to the first mirror M1 and the first image plane IP1 is located along a center axis of the hexagonal pyramid mirror 120. the first image plane IP1 is located at a position where a first distance L1 between the first mirror M1 and one pixel of the first partial image IM1 is identical to a second distance L2 between the first mirror M1 and one pixel of the first plane IP1 corresponding to the one pixel of the first partial image IM1.

In other words, the first image plane IP1 faces the first mirror M1 and has the center axis of the hexagonal pyramid mirror 120. In a similar manner, second to sixth image planes corresponding to second to sixth partial images of the display panel 130, respectively, are located along the center axis of the mirror 120. Accordingly, opposite mirrors, for example, the first and fourth mirrors M1 and M4, the second and fifth mirrors, and the third and sixth mirrors may be located at the same plane. In other words, the first and fourth image planes IP1 and IP4 are located at the same plane, the second and fifth planes are located at the same plane, and the third and sixth planes are located at the same plane.

Referring to FIG. 6B, the viewer in a direction of a boundary between the first and second mirrors M1 and M2 views parts of the first and second partial images IM1 and IM2. In other words, the viewer perceives as if the part of the first partial image IM1 were transmitted from a left half region of the first image plane IP1 and the part of the second partial image IM2 were transmitted from a right half region of the second image plane IP2. Accordingly, the viewer perceives a combined image consisting of the parts of the first and second partial images IM1 and IM2 from a first-second combined image plane IP12 as represented as a bent solid line in FIG. 6B. Because the combined image is made of image information corresponding to a half of the first partial image IM1 and image information corresponding to a half of the second partial image IM1 and IM2, the combined image has the same amount of image information as one partial image.

Referring to FIG. 7A, in the three-dimensional display device 210 of the second embodiment, an apex A of a hexagonal pyramid mirror 220 may be substantially located below a display panel 230. In other words, a first distance D1 between the apex A and the display panel 230 is substantially more than 0.

A first image plane IP1 is located such that a distance L3 between a first mirror M1 and one pixel of a first partial image IM1 is identical to a distance L4 between the first mirror M1 and one pixel of the first plane IP1 corresponding to the one pixel of the first partial image IM1. Accordingly, when the first mirror M1 makes a 45 degree angle with the display panel 230, the first image plane IP1 symmetrical with the first partial image IM1 with respect to the first mirror M1 is located at a plane at the first distance D1 from a center axis of the hexagonal pyramid mirror 120 toward the first mirror M1. In other words, the first image plane IP1 of the second embodiment is shifted at the first distance D1 which is the distance between the apex A and the display panel 230, compared to the first embodiment. In a similar manner, second to sixth image planes corresponding to second to sixth partial images, respectively, are located at planes at the first distance D1 from the center axis of the mirror 220. In other words, the first to sixth image planes are located every 60 degree angle around the center axis, and adjacent image planes makes a 60 degree angle with each other with respect to the center axis.

Accordingly, opposite mirrors, for example, the first and fourth mirrors M1 and M4, the second and fifth mirrors, and the third and sixth mirrors are located at the first distance D1 and are symmetrical with each other with respect to the center axis.

When each of the first and fourth mirrors M1 and M4 make a 45 degree angle with the display panel 230, the display panel 230 and parts of the first and fourth mirrors M1 and M4 below the display panel 230 form a right-angled isosceles triangular. Accordingly, a distance between the apex A and each of the first and fourth image planes IP1 and IP4 is identical to the first distance D1 between the apex A and the display panel 230. In other words, the first distance D1 between the apex A and the display panel 230 is identical to a distance between the center axis of the mirror 220 and each of the first to sixth image planes.

Referring to FIG. 7B, the viewer in a direction of a boundary between the first and second mirrors M1 and M2 views parts of the first and second partial images IM1 and IM2. In other words, the viewer perceives as if the part of the first partial image IM1 were transmitted from a left region of the first image plane IP1 with respect to the boundary and the part of the second partial image IM2 were transmitted from a right region of the second image plane IP2 with respect to the boundary. Accordingly, the viewer perceives a combined image consisting of the parts of the first and second partial images IM1 and IM2 from a first-second combined image plane IP12 as represented as a bent solid line in FIG. 7B. Each of the left region of the first image plane IP1 and the right region of the second image plane IP2 constituting the first-second combined image plane IP12 may have an area more than an half area of one image plane. Accordingly, the combined image at the first-second combined image plane IP12 may have image information more than image information of one partial image.

In other words, comparing FIG. 6B with FIG. 7B, while half of the image information of each of the first and second partial images IM1 and IM2 are combined in the first embodiment, more than half of the image information of each of the first and second partial images IM1 and IM2 are combined in the second embodiment. Accordingly, the viewer in the direction of the boundary between the first and second mirrors M1 and M2 perceives the more image information when the apex is below the display panel than when the apex contacts the display panel.

Figure 8:
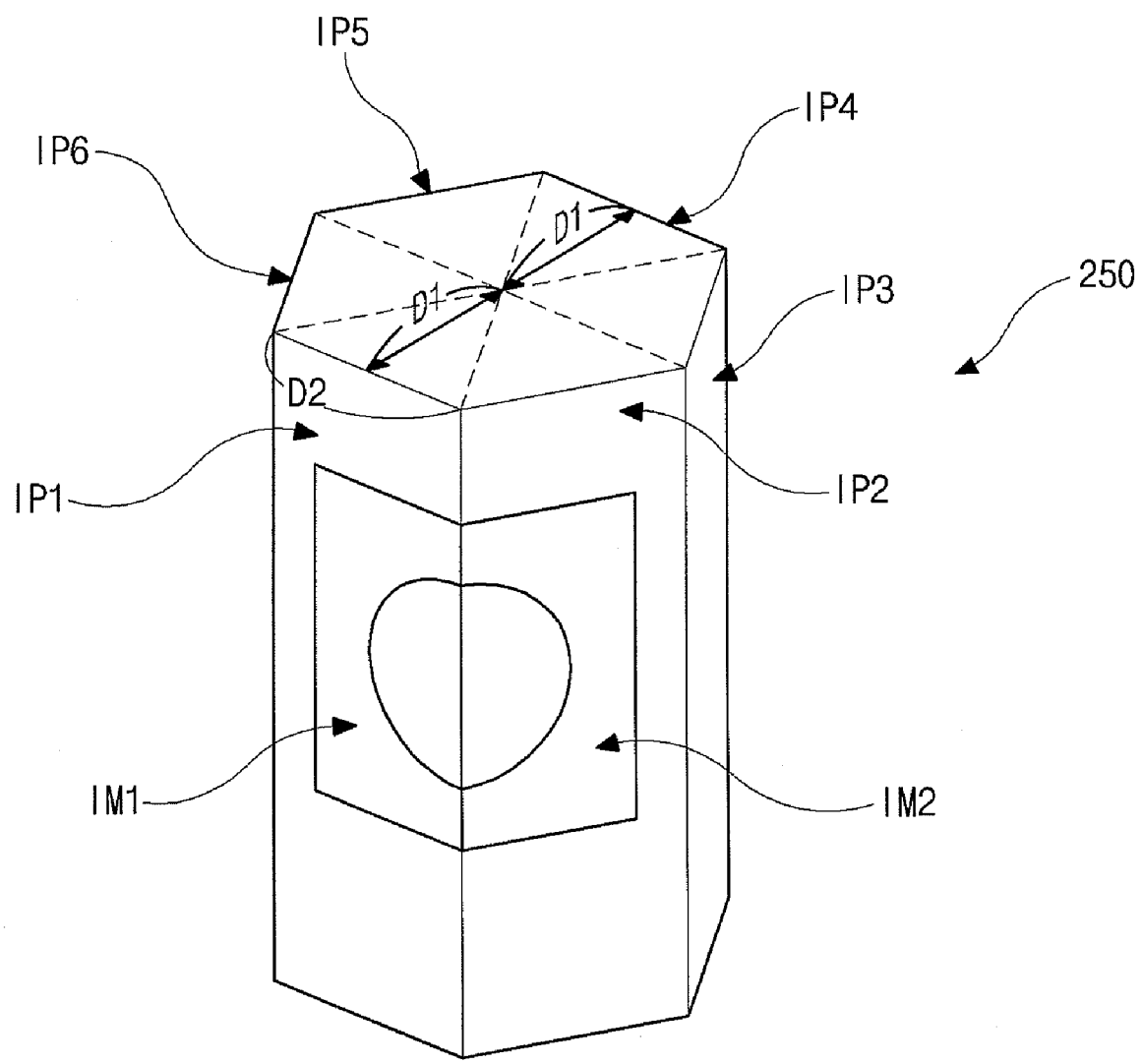
FIG. 8 is a view illustrating image planes of a three-dimensional display device according to the second embodiment.

FIG. 8 is a view illustrating image planes of a three-dimensional display device according to the second embodiment.

Referring to FIG. 8, in the second embodiment, first to sixth partial images may be perceived as if the first to sixth partial images existed on first to sixth image planes IP1 to IP6 corresponding to side surfaces of a hexagonal prism 250, respectively.

When an upper surface of the hexagonal pyramid mirror (220 of FIG. 7A) has a regular hexagonal shape, the hexagonal prism 250 may be a regular hexagonal prism. Regarding an upper surface hexagon of the hexagonal prism 250, a distance between a center axis of the hexagonal prism 250 and a side of the upper surface hexagon is a first distance D1, a length of the side is a second distance D2, and a distance between opposite sides is twice of the first distance D1.

It is considered that the three-dimensional display device (210 of FIG. 7A) of the second embodiment displays partial images through the side surfaces of the hexagonal prism 250. Accordingly, when the first to sixth partial images are set to correspond to image information which can be viewed by a viewer turning around a three-dimensional object, the viewer turns around the hexagonal prism 250 and perceives as if the three-dimensional object existed at the first to sixth image planes IP1 to IP6, and thus stable and natural floating images can be displayed.

To naturally display continuous images at the boundary of adjacent mirrors, partial images are appropriately set.

Figure 9:
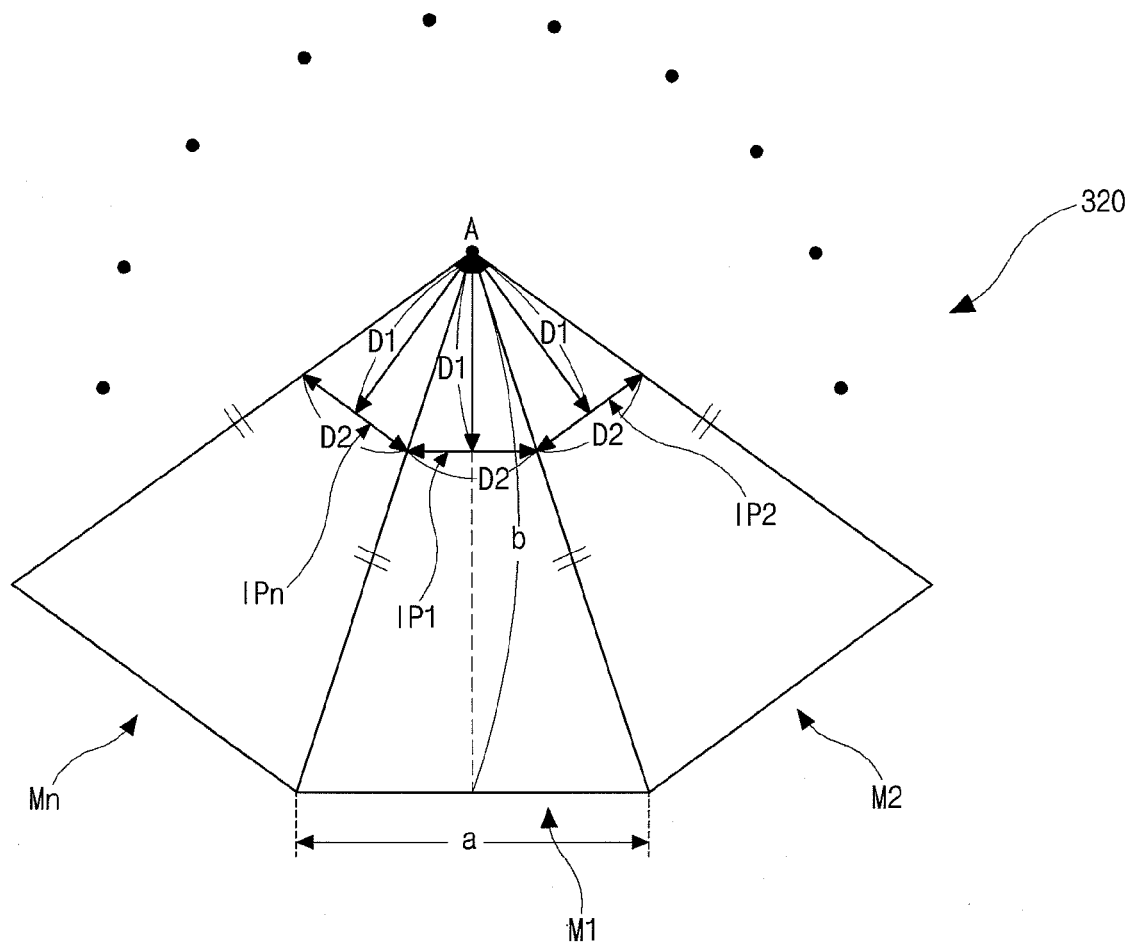
FIG. 9 is a plan view illustrating a n-gonal pyramid mirror of a three-dimensional display device according to a third embodiment.
Figure 10:
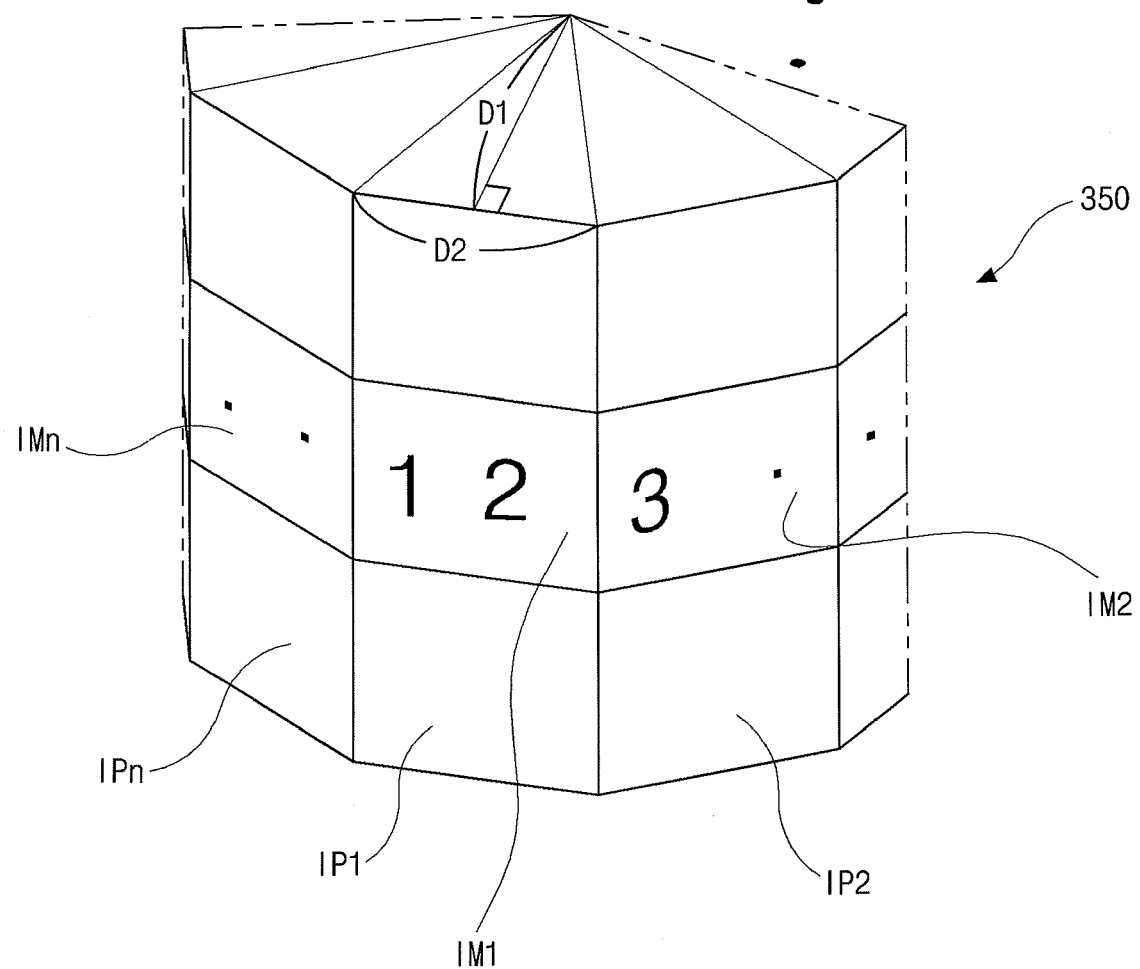
FIG. 10 is a view illustrating image planes of a three-dimensional display device according to the third embodiment

FIG. 9 is a plan view illustrating a n-gonal pyramid mirror of a three-dimensional display device according to a third embodiment, and FIG. 10 is a view illustrating image planes of a three-dimensional display device according to the third embodiment.

While the hexagonal pyramid mirror is described in the first and second embodiment, a polygonal pyramid mirror, for example, an n-gonal pyramid mirror 320 is described in the third embodiment. The n-gonal pyramid mirror 320 may include n isosceles triangular mirrors M1 to Mn. A display panel may display n partial images every (360/n) degree angle along a circumference. In other words, the n partial images may be displayed from the display panel every (360/N) degree angle along the circle. n may be a natural number equal to or more than 3, and may be set in consideration of fabrication of the n-gonal pyramid mirror and settings of the n partial images. The three-dimensional display device of the third embodiment may be similar to the three-dimensional display device of the second embodiment except for the n-gonal pyramid mirror and the display panel displaying the n partial images. Explanations of parts similar to parts of the second embodiment may be omitted.

Referring to FIG. 9, the three-dimensional display device of the third embodiment may include the n-gonal pyramid mirror 320. The n-gonal pyramid mirror 320 may include the first to $n^{th}$ isosceles triangular mirrors M1 to Mn.

An upper surface of the n-gonal pyramid mirror 320 may have an n-gonal shape which has continuous n isosceles triangles around a center of the upper surface of the n-gonal pyramid mirror 320. The isosceles triangle may have a bottom side length "a" and a height "b". Even though not shown in the drawings, an apex A of the mirror 320 may be located below the display panel, and a distance between the apex A and the display panel may be a first distance D1.

A first image plane IP1 corresponding to the first mirror M1 may be located at a plane at the first distance D1 from a center axis of the mirror 320. A width of the first image plane IP1 in the isosceles triangle of the upper surface of the mirror 320 corresponding to the first mirror M1 may be a second distance D2. The isosceles triangle of the upper surface of the mirror 320 corresponding to the first mirror M1 and an isosceles triangle defined by the first image plane IP1 and the center axis of the mirror 320 are of similitude. Accordingly, a proportional expression, a:b=D2:D1, is made, and a first expression, D2=(a/b)D1, is made. This relationship may identically apply to second to $n^{th}$ image planes IP2 to IPn.

The n-gonal upper surface of the mirror 320 can structurally be expressed using "a" and "b", and also, the mirrors M1 to Mn can structurally be expressed using "a" and "b". The distance between the apex A and the display panel can be expressed as the first distance D1. In other words, structure of the three-dimensional display device can structurally be expressed using "a", "b" and D1. Accordingly, when components of the three-dimensional display device are structurally set up, the second distance D2 can be determined by the first expression.

The second distance D2 may be used to set the partial images to naturally display continuous images at boundaries of adjacent mirrors.

Referring to FIG. 10, in the third embodiment, first to $n^{th}$ partial images IM1 to IMn may be perceived as if the first to $n^{th}$ partial images IM1 to IMn were displayed at first to $n^{th}$ image planes IP1 to IPn corresponding to side surfaces of an n-gonal prism 350, respectively.

When an upper surface of the n-gonal pyramid mirror (320 of FIG. 9) has a regular n-gonal shape, the n-gonal prism 350 may be a regular n-gonal prism, and an upper surface of the n-gonal prism 350 may have an n-gonal shape which has continuous n isosceles triangles. Each isosceles triangle of the upper surface of the n-gonal prism 50 may have a first distance D1 as a length of a bottom side and a second distance D2 as a height. Accordingly, a width of each of the first to $n^{th}$ image planes IP1 to IPn may be the second distance D2.

To display continuous images around the three-dimensional display device, partial images are appropriately set such that the images are not discontinued at boundaries between adjacent mirrors (M1 to Mn of FIG. 9).

Accordingly, when the partial images constituting one three-dimensional image are set, a distance between adjacent partial images may be the second distance D2, and thus continuous images can be naturally displayed even at the boundaries between adjacent mirrors.

Figure 11:
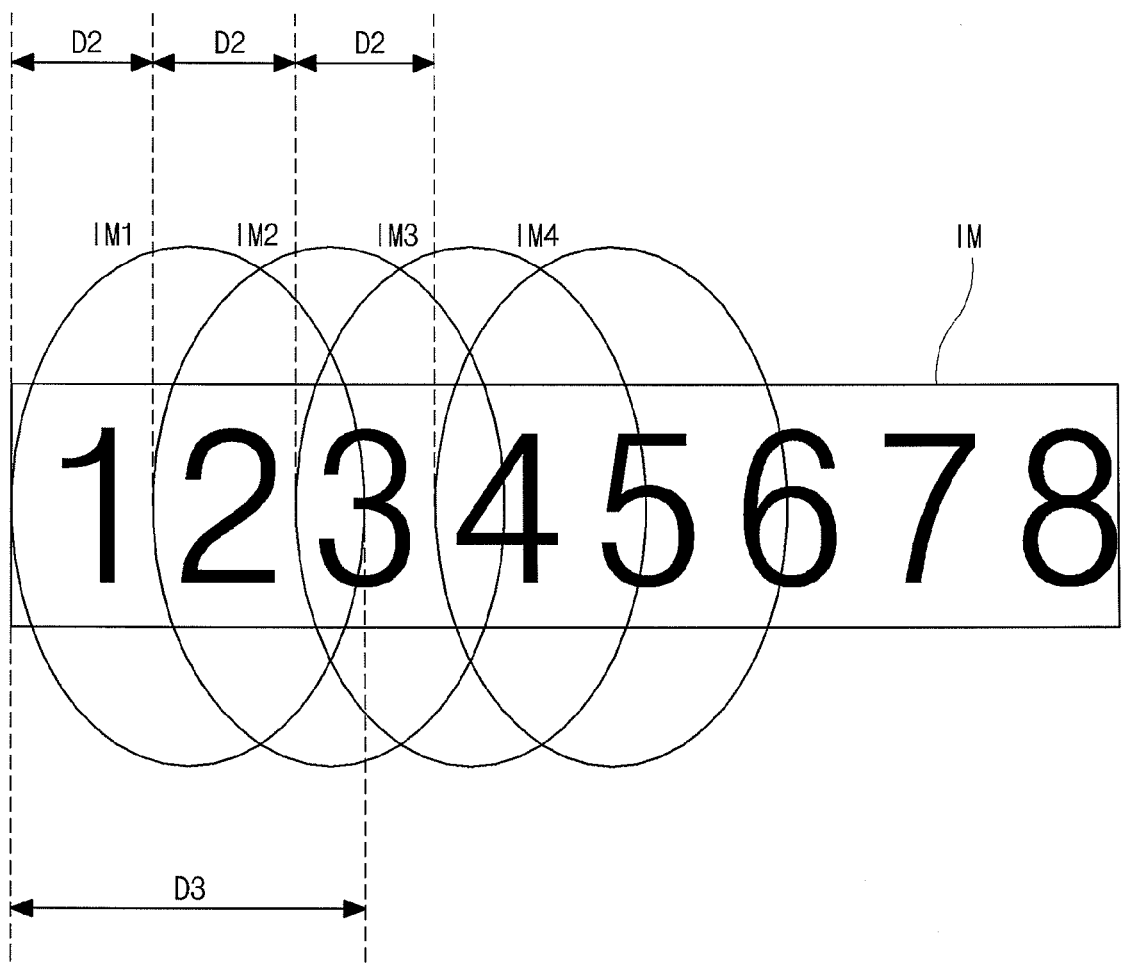
FIG. 11 is a view illustrating a method of setting partial images in a three-dimensional display device according to the third embodiment.

FIG. 11 is a view illustrating a method of setting partial images in a three-dimensional display device according to the third embodiment.

Referring to FIG. 11, when the three-dimensional display device of the third embodiment displays one image IM as a floating image, the one image IM may be divided into first to $n^{th}$ partial images which overlaps adjacent partial images and a distance between adjacent partial images may be a second distance D2, and thus a natural floating image can be continuously displayed. The second distance D2 may be set according to the first expression.

The one image IM may be a long image such as a panorama, or an image taken turning around an object.

After the one image IM is taken, the first to $n^{th}$ partial images are set such that a distance between the first and second partial images IM1 and IM2 is the second distance D2, and in a similar manner, each of distances between adjacent partial images is the second distances D2.

When a third distance D3 as a width of each of the first to $n^{th}$ partial images is more than the second distance D2, the first to $n^{th}$ partial images may set such that adjacent partial images overlap each other. In other words, adjacent partial images may share common image information.

When the first to $n^{th}$ partial images are displayed through the first to $n^{th}$ mirrors, adjacent partial images substantially overlap exactly at the boundary of the n-gonal prism (350 of FIG. 10).

Accordingly, the three-dimensional display device can naturally display continuous images even at the boundaries of adjacent mirrors, and thus a viewer can perceive an image as if the viewer viewed a real object in various directions turning around the object.

In other words, the three-dimension display device can realize motion parallax effect that the viewer perceives different images according to positions.

The third distance D3 as the width of each of the first to $n^{th}$ partial images may set to be equal to or more than the second distance D2 to prevent discontinuity at the boundaries. In consideration that a maximum number of mirrors, in the n-gonal pyramid mirror, on which a certain partial image may reflect may be n/2, the third distance D3 may be set to be equal or less than a (n/2) of the second distance D2. As a result, the third distance D3 may be within a range, $D2 \leq D3 \leq (n/2)*D2$.

Figure 12:
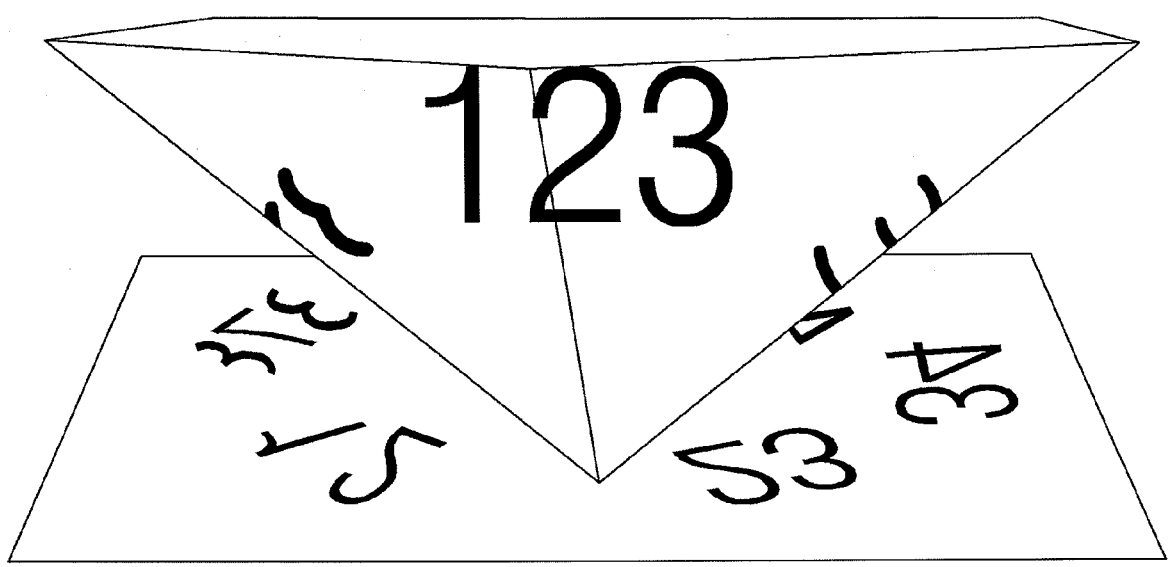
FIG. 12 is a view illustrating simulation result of a three-dimensional display device according to the third embodiment.

FIG. 12 is a view illustrating simulation result of a three-dimensional display device according to the third embodiment.

Referring to FIG. 12, when first to $n^{th}$ partial images are displayed through a display panel such that a distance between adjacent partial images may be a second distance (D2 of FIG. 11), a viewer turns around an n-gonal pyramid mirror (320 of FIG. 9) and perceives different images, and in particular, the viewer perceives continuous images at boundaries between adjacent mirrors of the n-gonal pyramid mirror.

For example, when a distance between the first and second partial images is the second distance D2, a continuous image "123" can be perceived at the boundary between the first and second mirrors.

Because the first and second partial images reflect on the mirrors and then transmitted to the viewer, in consideration of this reflection, the first and second partial images IM1 and IM2 are inversely displayed at the display panel.

Figure 13:
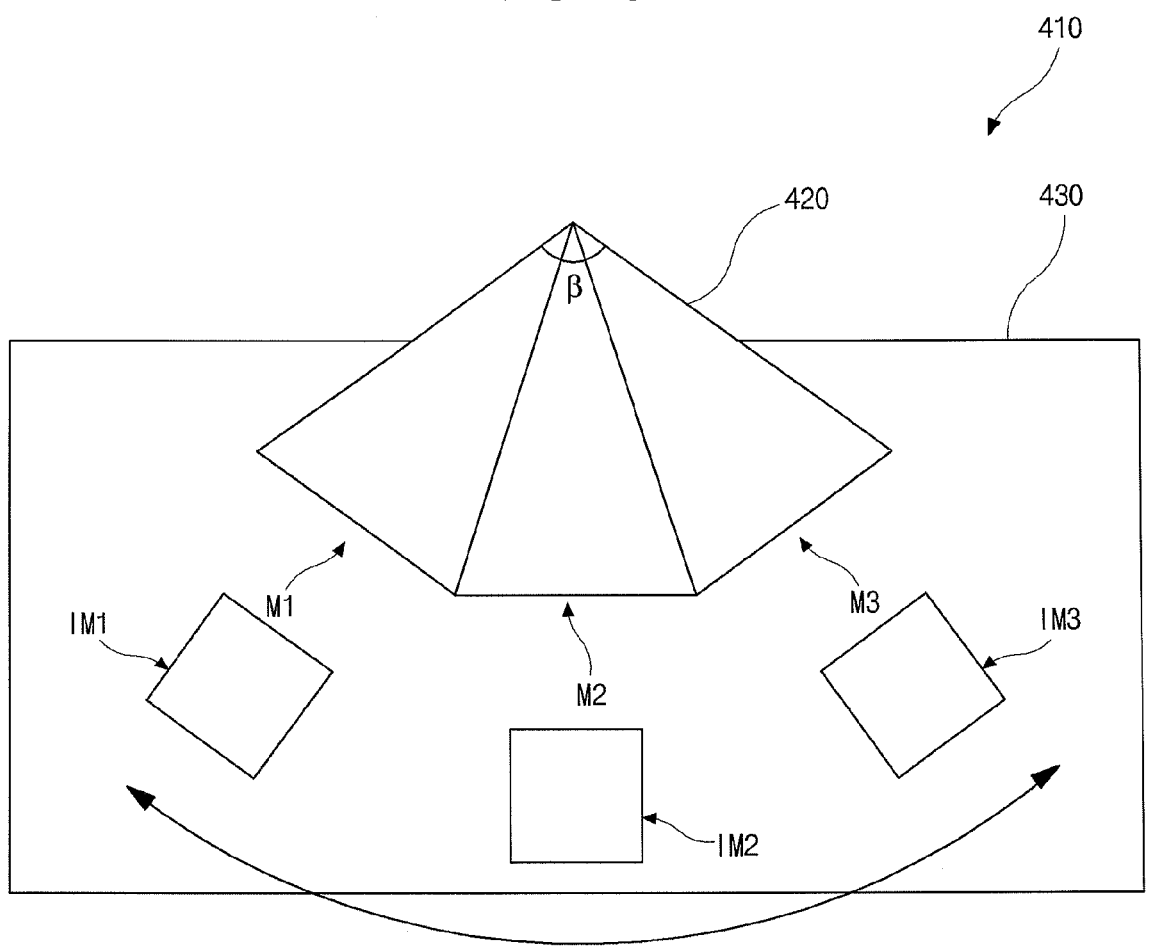
FIG. 13 is a plan view illustrating a three-dimensional display device according to a fourth embodiment.

FIG. 13 is a plan view illustrating a three-dimensional display device according to a fourth embodiment.

Referring to FIG. 13, the three-dimensional display device 410 may use a mirror having a part of an n-gonal pyramid, compared to the mirror with the whole n-gonal pyramid of the third embodiment.

In accordance with circumstances where the three-dimensional display device is installed, a case may occur that it is difficult for a viewer to view an image with the viewer turning 360 degrees around the three-dimensional display device. In other words, a viewing range may be limited in accordance with circumstances.

When the viewing range is limited, a partial n-gonal pyramid mirror 420 and a partial display panel 430, compared to the n-gonal pyramid mirror and the display panel of the third embodiment, are used, and the viewer can view a floating image within a viewing angle range around the three-dimensional display device 410.

For example, the partial n-gonal pyramid mirror 420 includes first to third mirrors M1 to M3, and the partial display panel 430 displays first to third partial images IM1 to IM3 along a circle arc. A number of the mirrors or partial images is less than n. The viewer can view a floating image within a viewing angle range of β less than a 360 degree angle.

Figure 14A:
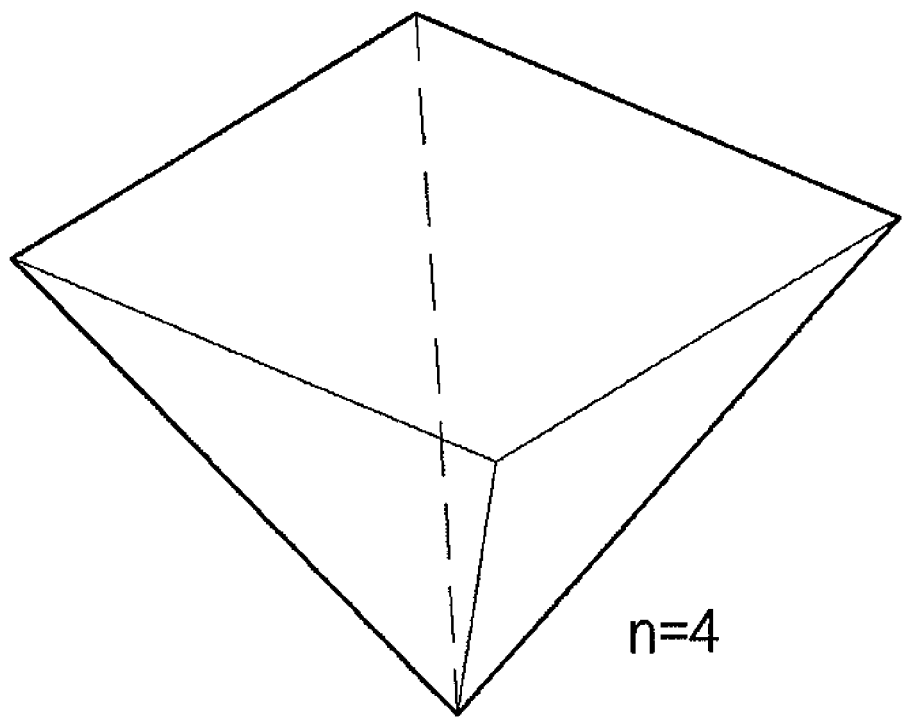
FIGS. 14A and 14B are perspective views illustrating tetragonal and pentagonal pyramid mirrors of three-dimensional display devices according to fifth and sixth embodiments, respectively.
Figure 14B:
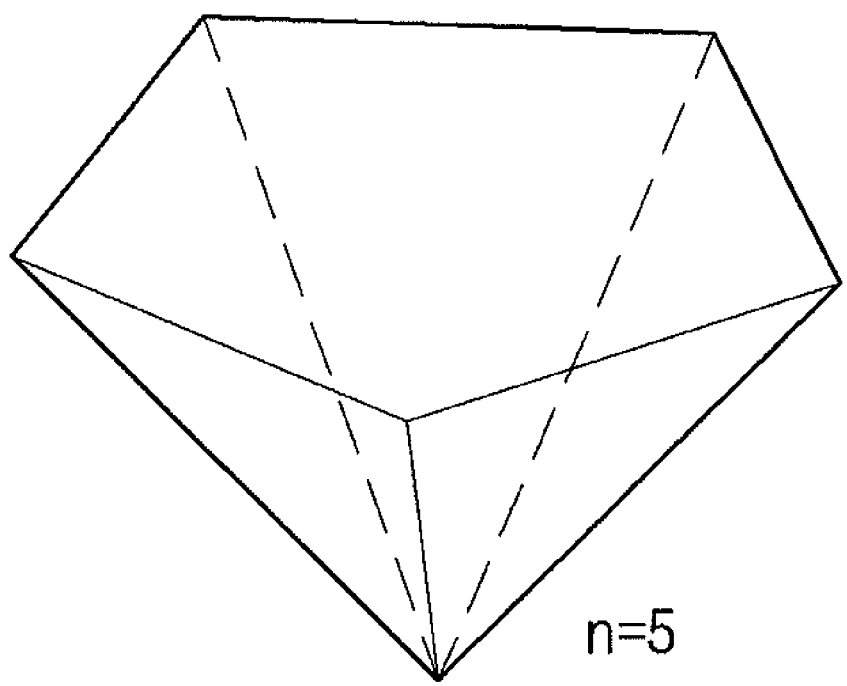

FIGS. 14A and 14B are perspective views illustrating tetragonal and pentagonal pyramid mirrors of three-dimensional display devices according to fifth and sixth embodiments, respectively.

The n-gonal pyramid mirror of the third embodiment includes n mirrors at the side surfaces, each of the n mirrors makes a 45 degree angle with the display panel, and the upper surface of the n-gonal pyramid mirror has a regular n-gonal shape. Referring to FIGS. 14A and 14B, tetragonal and pentagonal pyramid mirrors, respectively, are described as examples of n-gonal pyramid mirrors.

The tetragonal pyramid mirror may have four isosceles triangular mirrors at side surfaces and have a regular tetragonal upper surface. Each of the four mirrors may make a 45 degree angle with a display panel.

The pentagonal pyramid mirror may have five isosceles triangular mirrors at side surfaces and have a regular pentagonal upper surface. Each of the five mirrors may make a 45 degree angle with a display panel.

The three-dimensional display device according to the embodiments of the present disclosure includes the n-gonal pyramid mirror and the display panel and displays different images in accordance with positions of the viewer. Accordingly, stable floating images can be naturally displayed and power consumption can be reduced.

It will be apparent to those skilled in the art that various modifications and variations can be made in the display device and a method of displaying an image of embodiments of the invention without departing from the spirit or scope of the invention. Thus, it is intended that embodiments of the invention cover the modifications and variations of this invention provided they come within the scope of the appended claims and their equivalents.

What is claimed is:

1. A three-dimensional display device, comprising:
    a display panel displaying first to $n^{th}$ partial images along a circumference; and
    an n-gonal pyramid mirror including first to $n^{th}$ mirrors at n side surfaces, respectively, of the n-gonal pyramid mirror, wherein the first to $n^{th}$ mirrors reflect the first to $n^{th}$ partial images, respectively, and wherein each of the first to $n^{th}$ mirrors substantially makes a 45 degree angle with the display panel,
    wherein an apex of the n-gonal pyramid mirror is below the display panel and is at a first distance from the display panel, wherein first to $n^{th}$ image planes corresponding to the first to $n^{th}$ partial images face the first to $n^{th}$ mirrors, respectively, and wherein each of the first to $n^{th}$ image planes is at the first distance from a center axis of the n-gonal pyramid mirror toward the corresponding mirror,
    wherein the first to $n^{th}$ image planes forms n side surfaces of an n-gonal prism, and wherein a side of a regular n-gonal upper surface of the n-gonal prism has a length of a second distance and a distance between a center of the regular n-gonal upper surface of the n-gonal prism and the side of the regular n-gonal upper surface of the n-gonal prism is the first distance.

2. The device according to claim 1, wherein an angle of each of the first to $n^{th}$ partial images incident on the corresponding mirror is within a 10 degree angle with respect to a line perpendicular to a plane of the display panel.

3. The device according to claim 1, an upper surface of the n-gonal pyramid mirror has a regular n-gonal shape and is over the display panel.

4. The device according to claim 1, wherein each of the first to $n^{th}$ mirrors has a isosceles triangular shape and has a reflectance more than 0% and equal to or less than 100%.

5. The device according to claim 1, wherein an apex of the n-gonal pyramid mirror substantially contacts the display panel, wherein first to $n^{th}$ image planes corresponding to the first to $n^{th}$ partial images face the first to $n^{th}$ mirrors, respectively, and wherein each of the first to $n^{th}$ image planes has a center axis of the n-gonal pyramid mirror.

6. The device according to claim 1, wherein a side of a regular n-gonal upper surface of the n-gonal pyramid mirror has a length of "a" and a distance between a center of the regular n-gonal upper surface of the n-gonal pyramid mirror and the side of the regular n-gonal upper surface of the n-gonal pyramid mirror is "b", and wherein the second distance is expressed by an expression, $D2=(a/b)*D1$, where D1 and D2 are the first and second distances, respectively.

7. The device according to claim 6, wherein the first to $n^{th}$ partial images, for which an image is divided, are set for adjacent partial images to be at the second distance from each other.

8. The device according to claim 1, wherein n is one of 4, 5 and 6.

9. A method of displaying a three-dimensional image, comprising:
    dividing an image to set first to $n^{th}$ partial images;
    displaying the set first to $n^{th}$ partial images along a circumference in a display panel; and
    reflecting the displayed first to $n^{th}$ partial images on first to $n^{th}$ mirrors, respectively, of an n-gonal pyramid mirror, wherein each of the first to $n^{th}$ mirrors substantially makes a 45 degree angle with the display panel,
    wherein an apex of the n-gonal pyramid mirror is below the display panel and is at a first distance from the display panel, wherein a side of a regular n-gonal upper surface of the n-gonal pyramid mirror has a length of "a", wherein a distance between a center of the regular n-gonal upper surface of the n-gonal pyramid mirror and the side of the regular n-gonal upper surface of the n-gonal pyramid mirror is "b", wherein a second distance is expressed by an expression, $D2=(a/b)*D1$, where D1 and D2 are the first and second distances, respectively, and wherein the first to $n^{th}$ partial images are set for adjacent partial images to be at the second distance from each other.

* * * * *